US005974961A

United States Patent [19]

Kazo et al.

[11] Patent Number: 5,974,961

[45] Date of Patent: Nov. 2, 1999

[54] MULTI-HOPPER CARD EMBOSSER

[75] Inventors: Osamu Kazo; Tsuyoshi Kokubo; Hirokazu Furuya, all of Tokyo, Japan

[73] Assignees: NEC Corporation; Dodwell BMS, Ltd, both of Tokyo, Japan

[21] Appl. No.: 08/991,009

[22] Filed: Dec. 15, 1997

[30] Foreign Application Priority Data

Dec. 13, 1996 [JP] Japan .................................... 8-333622

[51] Int. Cl.[6] ..................................................... G06K 13/04

[52] U.S. Cl. .................................................. 101/4; 101/18

[58] Field of Search ................................... 101/4, 18, 27, 101/32

[56] References Cited

U.S. PATENT DOCUMENTS

| | | | |
|---|---|---|---|
| 4,519,600 | 5/1985 | Warwick et al. | 271/4.01 |
| 5,009,332 | 4/1991 | Sannel et al. | 209/652 |
| 5,060,275 | 10/1991 | Hirano | 382/100 |
| 5,451,037 | 9/1995 | Lundstrom | 270/1.1 |
| 5,503,514 | 4/1996 | Lamanna et al. | 414/753 |
| 5,614,707 | 3/1997 | Lundstrom et al. | 235/479 |
| 5,837,991 | 11/1998 | LaManna et al. | 235/475 |

FOREIGN PATENT DOCUMENTS

| | | |
|---|---|---|
| 56-38281 | 4/1981 | Japan . |
| 58-51393 | 3/1983 | Japan . |
| 60-083187 | 4/1985 | Japan . |
| 60-501054 | 7/1985 | Japan . |
| 63-292292 | 11/1988 | Japan . |
| 1-253495 | 10/1989 | Japan . |
| 2-024777 | 1/1990 | Japan . |
| 5-221534 | 8/1993 | Japan . |
| 5-298531 | 11/1993 | Japan . |
| 7-325673 | 12/1995 | Japan . |

*Primary Examiner*—Edgar Burr
*Assistant Examiner*—Daniel J. Colilla
*Attorney, Agent, or Firm*—Foley & Lardner

[57] ABSTRACT

A multi-hopper embosser comprising a card processing apparatus (13, 14, 15) for performing encoding, embossing and tipping processings on a card, plural hoppers (11) which are connected to the card processing apparatus via a loader unit (12) and adapted to stock cards therein, and a control apparatus (18) for controlling the card processing apparatus and the loader unit (12) to take out the card from a selected one of the plural hoppers (11) and perform the encoding, embossing and tipping processings on the card taken out.

8 Claims, 4 Drawing Sheets

MULTI-HOPPER CARD EMBOSSER

BACKGROUND OF THE INVENTION

1. Field of the Invention

The present invention relates to an apparatus which is generally called as an embosser for embossing cards.

2. Description of Related Art

This type of embosser is disclosed in Japanese Patent Application Laid-open Nos. Sho-60-501054, Sho-58-051393, Sho-56-038281, etc.

There has been hitherto known an embosser in which a card processing apparatus for performing embossing processing on cards is connected to a hopper for stocking cards. In this type of embosser, a card is picked up from the hopper and supplied to the card processing apparatus on the basis of an instruction of a computer, and the embossing processing and the encode processing are performed in the card processing apparatus.

However, the conventional embossers as described above are inadequate in that card processing must be performed on every card type. That is, if another type of card is required to be embossed, an operator must replace one type of card for the other type of card in the hopper. Further, when an error is caused on a card during the encoding processing or the like or when an operator forgets to take out a card, the operator's assistance is indispensable to take out the card or release the error. However, there has not yet been developed any embosser which can avoid the above disadvantage of the conventional embossers.

SUMMARY OF THE INVENTION

An object of the present invention is to provide a multi-hopper embosser in which a specified type of card is selected from plural types of cards without any assistance of an operator to perform embossing processing by only one card processing apparatus.

In order to attain the above object, according to the present invention, there is provided a multi-hopper embosser comprising:

a card processing apparatus for performing embossing processing on a card;

plural hoppers which are connected to the card processing apparatus and adapted to stock cards therein; and a control apparatus for controlling the card processing apparatus to perform the embossing processing on a card taken out from a selected one of the plural hoppers.

Further, according to the present invention, there is provided a card issuing system in which the above-described multi-hopper embosser is associated with an automatic machine system such as an automatic contract system.

The card processing apparatus may perform encoding processing as well as the embossing processing, and the control apparatus controls the card processing apparatus to perform the encoding processing on the card.

The multi-hopper embosser may further comprises a loader unit for taking out the card from the selected one of said plural hoppers and feeding the card to said card processing apparatus.

The multi-hopper embosser may further comprise a reject unit for withdrawing a card which is left behind or causes an error.

The multi-hopper embosser may further comprise judgement means for judging whether the card taken out is a predetermined card, and card feeding means for feeding the card to the card processing apparatus when the card is the predetermined card, or discharging the card to the reject unit when the card is not the predetermined card.

According to the present invention, a desired type of card can be selected from plural types of cards with no assistance of an operator by using only one embosser, and a customer who makes an application for issuance of a card can directly and immediately obtain the card on which the name of the customer and his/her personal data are embossed/encoded and use it immediately. Further, when an error occurs in the encoding operation or when a card is left behind, a restoration operation can be automatically performed with no assistance of an operator.

DETAILED DESCRIPTION OF THE PREFERRED EMBODIMENT

A preferred embodiment according to the present invention will be described hereunder with reference to the accompanying drawings.

Figure 1:
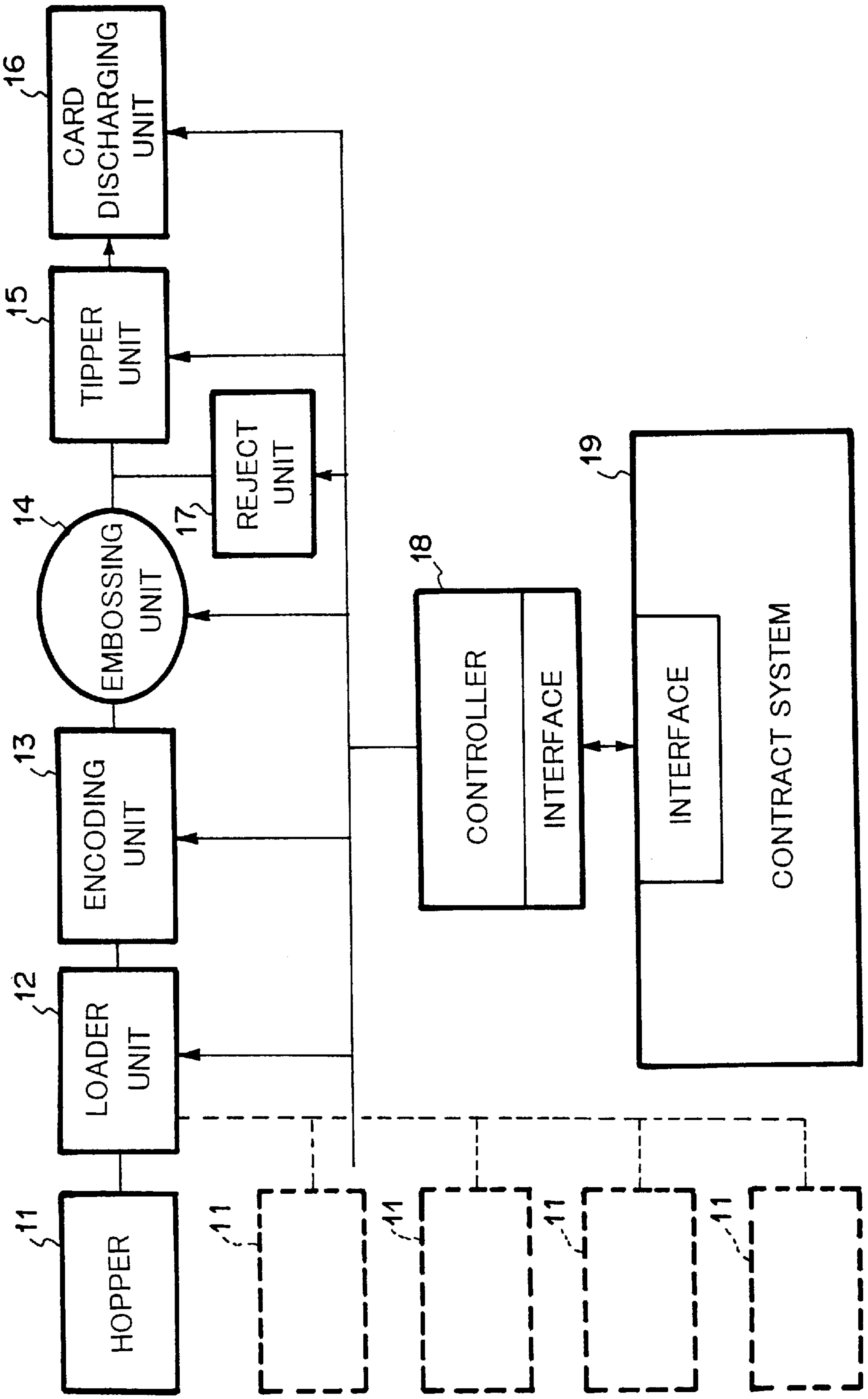
FIG. 1 is a block diagram showing an embodiment of a multi-hopper embosser according to the present invention associated with a contract system.

FIG. 1 is a block diagram showing a multi-hopper embosser according to an embodiment of the present invention which is applied to a contract system as an automatic machine system. To this multi-hopper embosser, five stages of hoppers 11 at maximum can be connected. Each of the hoppers 11 is connected to a loader portion or loader unit 12. The loader unit 12 constitutes a feeding unit for feeding to a predetermined position a card or card blank which is fed from each hopper 11.

The data of a magnetic stripe on the card thus fed are subjected to read-out and write-in operations by an encoding unit 13. Further, the name and personal information are embossed on the card by an embossing unit 14. The projection portion of characters which are formed by the embossing operation is colored by a tipper unit 15. Thereafter, the card thus processed is discharged by a card discharging unit 16.

When the card is not taken out within a predetermined fixed time or it is left behind, the card is returned to a reject unit 17. Further, when an error occurs in the encoding unit 13, the embossing unit 14, etc., the card is fed to the reject unit 17.

A controller 18 has an interface function for connecting it to a contract system 19, and it controls the operation of each of the hopper 11, the loader unit 12, the encoding unit 13, the embossing unit 14, the tipper unit 15, the card discharge unit 16 and the reject unit 17 on the basis of the transmission/reception of signals to/from the contract system 19 as described later. The assembly of the encoding unit 13, the embossing unit 14 and the tipper unit 15 is referred to as "card processing apparatus".

Figure 2:
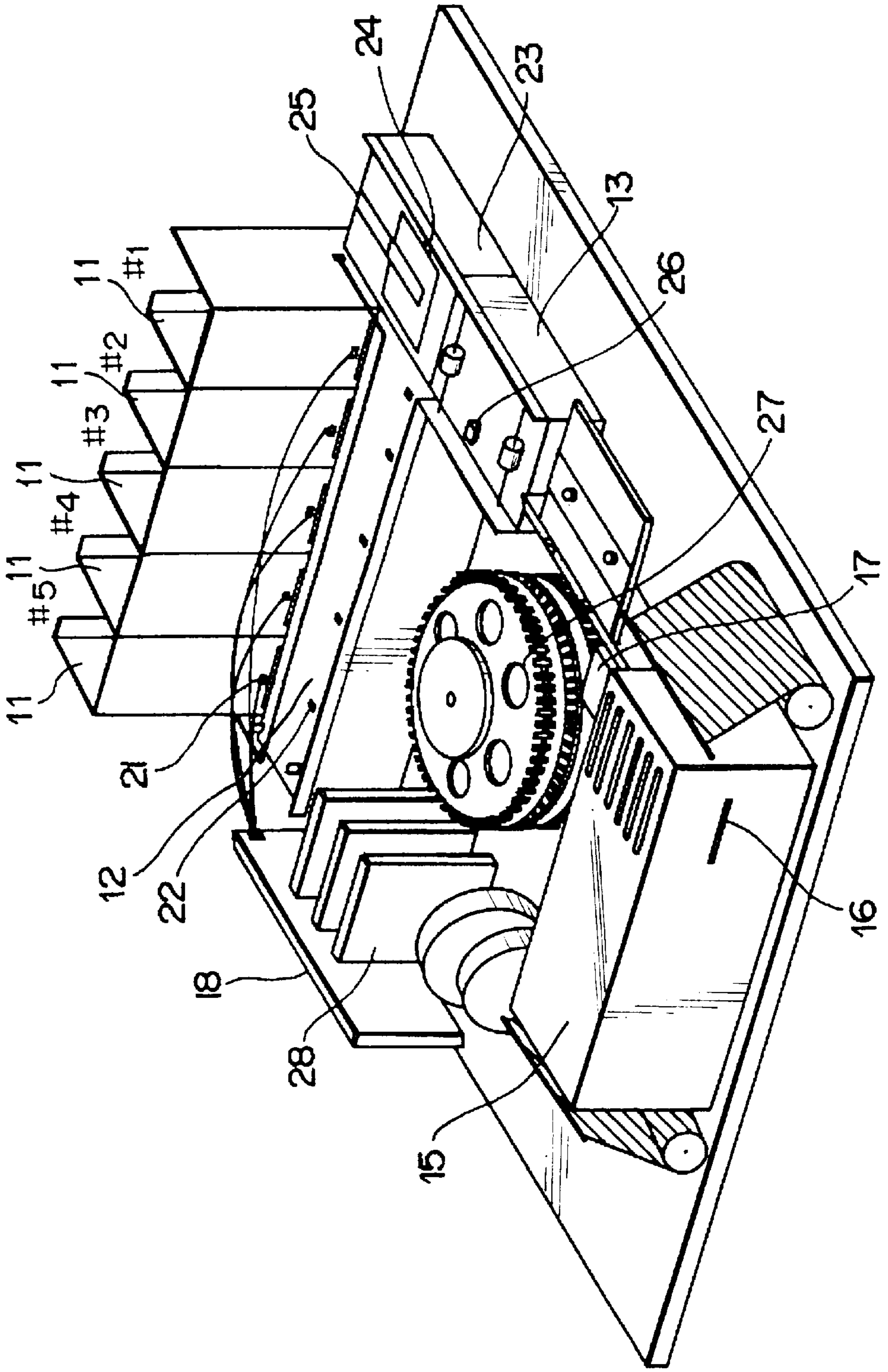
FIG. 2 is a perspective view showing the outlook of the multi-hopper embosser shown in FIG. 1.

FIG. 2 is a diagram showing the outlook of the multi-hopper embosser.

For descriptive purposes, plural hoppers 11 are represented by reference numerals #1 to #5. Each of the hoppers #1 to #5 accommodates cards of a type different from that of the others. It is now assumed that one card is fed out from a hopper (for example, a hopper #1) selected on the basis of control data of a host computer (not shown) of the contract system to the loader unit 12 by a DC motor (not shown). A card out sensor 21 and a loader sensor 22 are provided for each hopper 11. When the card arrives at the card out sensor 21 and then the loader sensor 22, the card out sensor 21 and the loader sensor 22 transmit a card out recognition signal and a loader recognition signal respectively to the controller 18. In accordance with these recognition signals, the controller 18 drives a loading pawl of the loader unit 12 by a step motor (not shown) to feed the card to a loader home 23. When the card arrives at the loader home 23, a loader home sensor 24 generates a home recognition signal. In accordance with the home recognition signal, the controller 18 moves a loader kicker 25 by a DC motor (not shown) to feed the card in the loader home 23 to the encoding unit 13. The subsequent operations such as encoding, embossing, chpping, etc. are substantially the same as the conventional embosser.

In FIG. 2, reference numeral 26 represents an encoder sensor for detecting the card, reference numeral 27 represents a drum for embossing processing and reference numeral 28 represents a driver of the embossor.

The card of desired type can be selected from any of the hoppers 11 (affixed with #1 to #5) by the multi-hopper embosser as described above to be immediately issued by the same machine in accordance with a customer's need.

Next, the operation of the controller 18 will be described in detail with reference to the flow charts of FIGS. 3 and 4 together with FIGS. 1 and 2.

It is assumed that an unmanned contract system issues a card of a customer's desired type on the basis of the operation by the customer before the contract system. The operation is performed with an operation key and an operation panel (not shown) according to an operation procedure instructed by the computer of the contract system 19. A preliminary examination is carried out on the customer, and an instruction of issuing a card is made to the multi-hopper embosser through RS232C by the computer only when the issuance of the card is acknowledged RS232C is an accepted industry standard for serial communications. This standard, which is in its third version (C-version), defines the specific lines and signal characteristics used by serial communications controllers to standardize the transmission of serial data between devices. That is, in step SI of FIG. 3, the multi-hopper embosser receives a hopper selection command as an instruction command from the computer.

In step S2, one hopper is selected from the plural hoppers 11 on the basis of the instruction command which is received through the RS232C. Further, in step S3, a DC motor for feeding the card in the hopper which is selected in step S2 is driven. That is, a feed command is generated, and the kicker is moved in accordance with the feed command to feed the card to the loader unit 12. In step S4, it is judged whether the loader sensor 22 is turned on after turn-on of the card out sensor 21 or not. If the loader sensor 22 is not turned on, it is judged in step S5 that the card is jammed, and the processing returns to the step S3.

If the loader sensor 22 is turned on in step S4, the processing goes to step S6 to generate a loader carry command, whereby the load pawl is moved to feed the card to the loader home 23. It is judged in step S7 whether the loader home sensor 24 is turned on or not. If the loader home sensor 24 is not turned on, it is judged in step S8 that the card is jammed, and the processing returns to the step S6. As described above, by the actuation of the card out sensor 21, the loader sensor 22 and the loader home sensor 24, the controller 18 can check whether the card is accurately fed to the loader home 23.

If the loader home sensor 24 is turned on in step S7, the processing goes to step S9 to drive a DC motor for the loader kicker so that the card of the selected type is fed out to the encoding unit 13 by the loader kicker 25. Thereafter, the processing goes to step S10 and if the encoder sensor 26 is not turned on, it is judged in step Sll that the card is jammed, thereafter the processing returning to step S9.

When in step S10 the encoder sensor 26 is turned on and thus existence of the card is confirmed, the processing goes to step S12 and the card is moved at a fixed speed by the stepping motor of the encoding unit 13 to write (magnetize) the encode data into the magnetic stripe on the card according to JIS standards, ISO standards, etc. The data to be recorded correspond to personal data of the customer who makes an application for issuance of the card.

Figure 3:
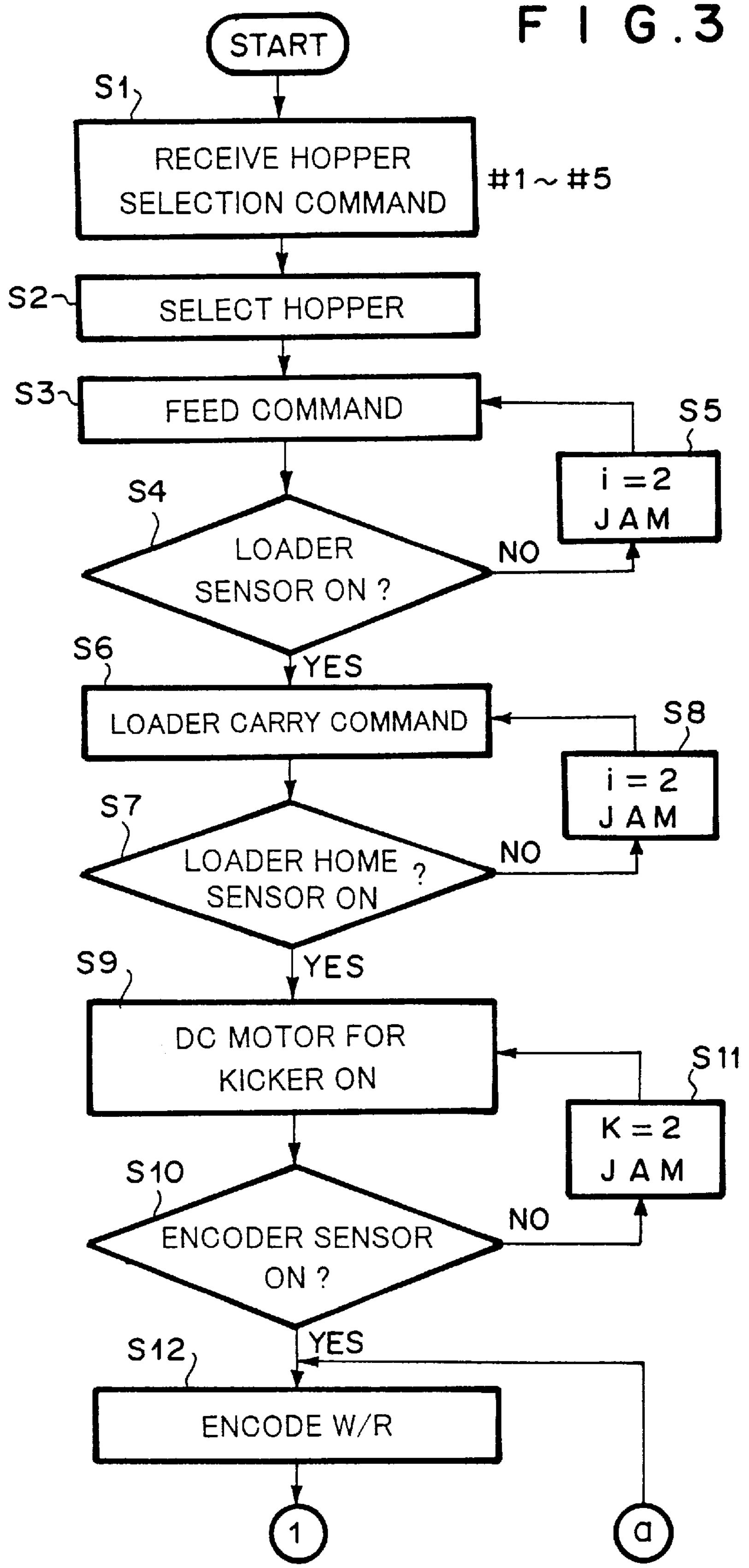
FIG. 3 is a flow chart showing the main part of the operation of a control apparatus for the multi-hopper embosser shown in FIGS. 1 and 2.

The description on a part of the operation of the controller 18 as shown in FIG. 3 is completed. The other part of the operation of the controller 18 is shown in FIG. 4.

Figure 4:
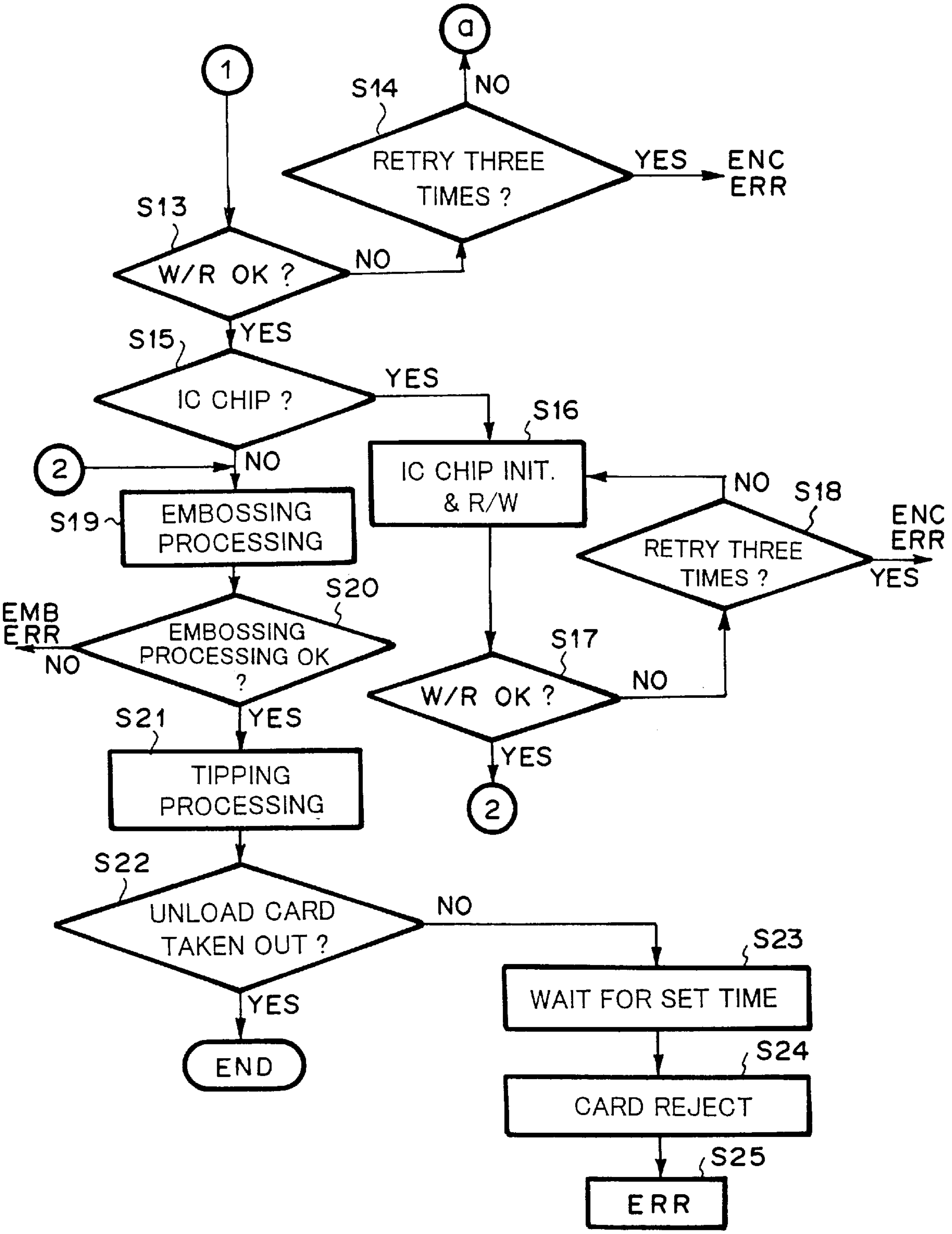
FIG. 4 is a flow chart showing the residual part of the operation of the control apparatus for the multi-hopper embosser shown in FIGS. 1 and 2.

It is judged in step S13 of FIG. 4 whether the data which are written and read out by the encoding unit 13 is identical with data contained in the computer or not. That is, the verification of the written data is carried out. If the written data are not verified, steps S12 and S13 are repeated via step S14, in which if the verification is retried three times an encode error (ENC ERR) is recognized on the card, and the card is fed to the reject unit 17.

If the written data are verified, it is judged in step S15 whether the card has an IC chip (that is, the card is IC type card) or not. If positive, the IC chip is initialized and the necessary data are written in the IC chip in step S16.

It is judged in step S17 whether the data which are written in the IC chip and read out by the encoding unit 13 is identical with data contained in the computer or not. That is, the verification of the written data is carried out. If the written data are not verified, steps S16 and S17 are repeated via step S18, in which if the verification is retried three times the encode error (ENC ERR) is recognized on the card, and the card is fed to the reject unit 17.

As mentioned in the above, if the data recorded in each of the magnetic stripe and the IC chip are judged to be accurate through the verification, the processing goes ahead to a next step. On the other hand, the written data are judged to be incorrect even if only one bit of the written data is incorrect, and then an error command is transmitted to the computer. In this case, the card to which the error is judged is discharged to the reject box or reject unit 17.

If the written data are verified in step S17 or if it is judged as negative in step S15, the embossing processing is carried out in step S19.

It is judged in step S20 whether the embossing processing is carried out well or not. If negative, an embossing error (EMB ERR) is recognized on the card, and the card is fed to the reject unit 17. If positive, the tipping processing is carried out in step S21. Then, it is judged in step S22 whether the unload card is taken out by the customer from the card discharging unit 16 or not.

If negative in step S22, waiting for a predetermined duration of time is carried out in step S23, then the card is fed to the reject unit 17 in step S24 resulting in error (ERR) in step S25.

Further, a card which has been already subjected to the embossing processing or the encoding processing may be set in a hopper and fed on the basis of the instruction of the computer to add customer information (emboss data/encode data) to the card.

In this case, the computer can judge whether the card taken out from the hopper and fed to the encoding unit 13 is a predetermined card or not by reading the previously encoded data, and when the card is not the predetermined card, the card is discharged to the reject unit 17.

The multi-hopper embosser as described above may be applied to contract machine systems suitable for consumer loan. In this case, a customer who makes an application for issuance of a card can select a desired type of card from plural types of cards with no assistance of an operator by using only one embosser, and then the customer can directly and immediately obtain the card on which the name of the customer and his/her personal data are embossed/encoded and use it immediately.

What is claimed is:

1. A multi-hopper embosser comprising:

a card processing apparatus for performing embossing processing on a card;

plural hoppers which are connected to said card processing apparatus and adapted to stock different card types therein;

a control apparatus for controlling said card processing apparatus to perform the embossing processing on a card taken out from a selected one of said plural hoppers, said control apparatus adapted to determine whether embossing has been performed correctly and to determine whether cards are left behind in the multi-hopper embosser; and a reject unit, communicating with said control apparatus, for receipt of cards on which embossing is performed incorrectly and for receipt of cards that are left behind in the multi-hopper embosser.

2. The multi-hopper embosser as claimed in claim 1, wherein said card processing apparatus includes an encoding unit for encoding processing, and said control apparatus controls said encoding unit to perform the encoding processing on the card.

3. The multi-hopper embosser as claimed in claim 1, further comprising a loader unit for taking out the card from the selected one of said plural hoppers and feeding the card to said card processing apparatus.

4. The multi-hopper embosser as claimed in claim 1, further comprising a judgement unit for judging whether the card taken out is a predetermined card, and a card feeding assembly for feeding the card to said card processing apparatus when the card is the predetermined card, or discharging the card to said reject unit when the card is not the predetermined card.

5. The multi-hopper embosser as claimed in claim 1, wherein said control apparatus includes an interface for communicating with an automatic machine system.

6. The multi-hopper embosser as claimed in claim 1, wherein said card processing apparatus includes an encoding unit for encoding processing, and said control apparatus controls said encoding unit to perform the encoding processing on the card.

7. The multi-hopper embosser as claimed in claim 5, wherein said multi-hopper further comprises a loader unit for taking out the card from the selected one of said plural hoppers and feeding the card to said card processing apparatus.

8. The multi-hopper embosser as claimed in claim 6, further comprising a judgement unit for judging whether the card taken out is a predetermined card, and a card feeding apparatus for feeding the card to said card processing apparatus when the card is the predetermined card, or discharging the card to said reject unit when the card is not the predetermined card.

* * * * *